Feb. 12, 1952     A. E. BAAK     2,585,295
CONTROL APPARATUS
Filed Oct. 24, 1946     3 Sheets-Sheet 1
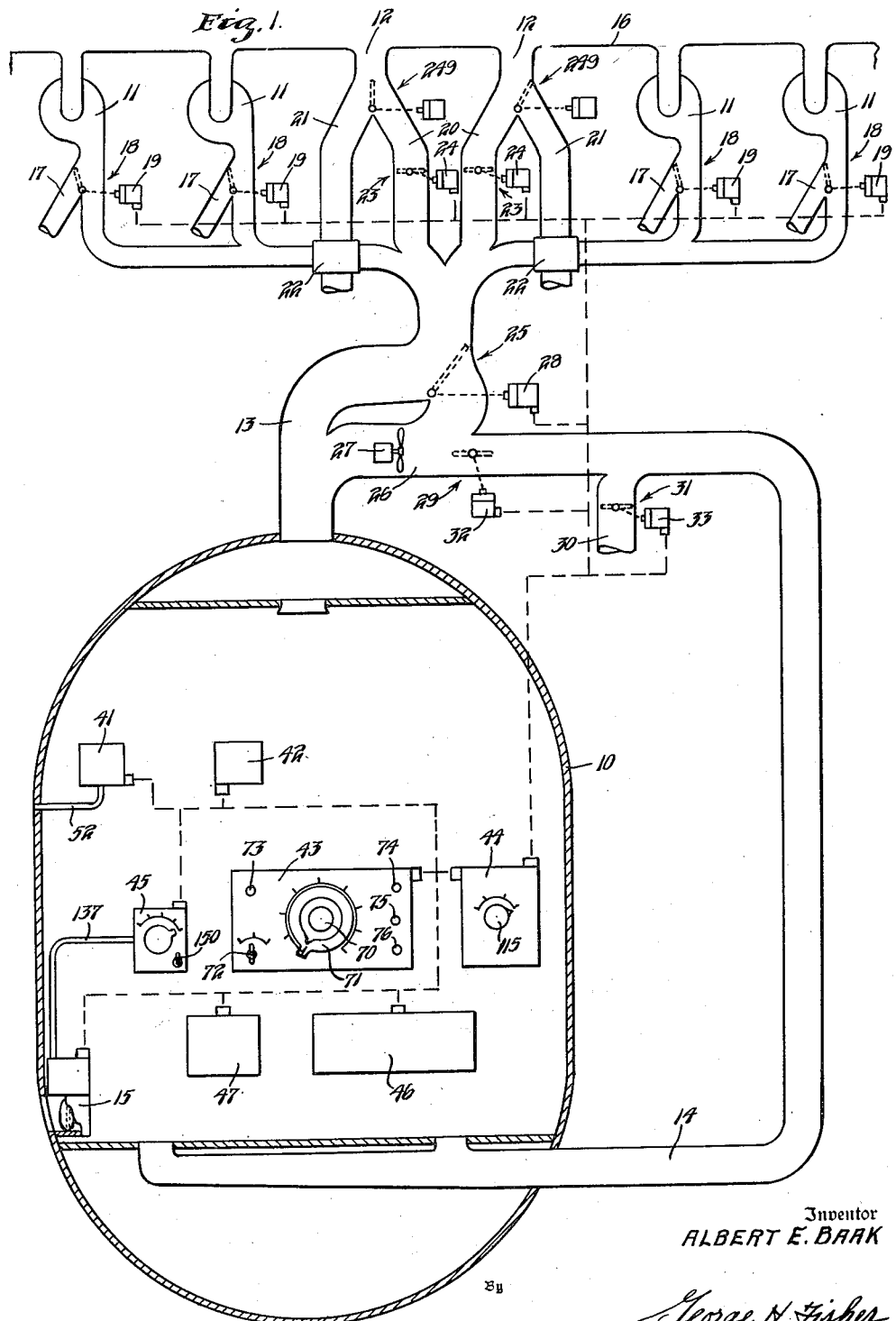
Inventor
ALBERT E. BAAK
By George N. Fisher
Attorney

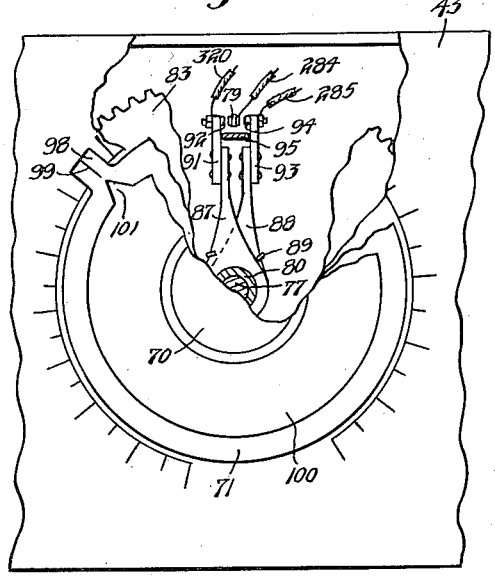

Feb. 12, 1952  A. E. BAAK  2,585,295
CONTROL APPARATUS
Filed Oct. 24, 1946  3 Sheets-Sheet 3

Inventor
ALBERT E. BAAK
BY George H. Fisher
Attorney

Patented Feb. 12, 1952

2,585,295

UNITED STATES PATENT OFFICE 2,585,295

CONTROL APPARATUS

Albert E. Baak, Los Angeles, Calif., assignor to Minneapolis-Honeywell Regulator Company, Minneapolis, Minn., a corporation of Delaware Application October 24, 1946, Serial No. 705,261

16 Claims. (Cl. 98—1.5)

The present invention is directed to improved control apparatus for the pressurizing of aircraft cabins.

Assuming an adequate supply of air for an aircraft cabin, the pressure within the cabin can be controlled by regulating the outflow of the air. The pressure to be maintained will depend upon the adjustments of the system, the characteristics of the aircraft, the altitude to be attained by the airplane, the elevation of the landing field to be used, and other such factors. In addition, the rate of change of pressure must be kept within the desired limits, as sudden changes in pressure from any cause cannot be permitted.

In view of the many requirements of a successful system, it is a principal object of this invention to provide improved cabin pressure control apparatus for aircraft.

It is also an object to provide improved cabin pressure control apparatus operable to maintain any desired pressure in excess of atmospheric pressure, within a predetermined limiting differential.

It is a further object to provide cabin pressure control apparatus of such nature that increases in pressure differential are at a controlled rate regardless of the variations in altitude of the aircraft.

It is an additional object to provide automatic cabin pressure control apparatus that can be manually actuated if desired.

It is an object to provide control apparatus which may be either automatic in operation or manually actuated and which will indicate the position of the controlled device under either sort of operation.

It is a further object to provide control apparatus including means for shifting the control point of said apparatus to an adjusted value at a timed rate and which also includes means for indicating the control point at any particular instant.

It is an additional object to provide control apparatus including a control point index for continuously indicating the actual control point and means for actuating the said index when the controlling device is either manually or automatically operated.

It is also an object to provide control apparatus for a pressurized aircraft cabin which includes a control point adjusting means which keeps step with the pressure in the aircraft cabin when the airplane descends below the altitude setting of the cabin so that a subsequent increase in altitude of the aircraft will result in the pressure of the cabin resuming its controlled value at a controlled rate.

It is a similar object to provide control apparatus for a pressurized aircraft cabin which includes a control point adjusting means and index which keeps step with the actual pressure in the cabin when the aircraft is operated in an unsupercharged condition.

It is a further object to provide cabin pressure control apparatus so arranged that it cannot be shifted from a pressurized condition to a nonpressurized condition, or the reverse, unless the outflow valve is wide-open so that there can be no sudden pressure changes.

It is an object to provide cabin pressure control apparatus which is inherently safe and dependable.

It is a further object to provide control apparatus wherein the control can be shifted from automatic to manual and back to automatic without pressure changes due to the said shifting, and wherein pressure changes due to the operation of the automatic control will be at a timed rate.

It is also an object to provide control means for the pressure control apparatus, pressure seals, and the like, of an aircraft wherein it is impossible to actuate this apparatus in a manner to suddenly decompress the said cabin.

It is a further object to provide pressure control apparatus for an aircraft wherein signal means are provided for showing power failure, low pressure, an open valve, and the use of the manual override control.

These and other objects will become apparent upon a study of the following specification and drawings wherein:

Figure 1 is a schematic showing of the present control equipment applied to a pressurized aircraft cabin;

Figure 2 is an elevation view of the control point selector and index of the control panel, with parts broken away to better show the construction;

Figure 3 is a sectional end view of the aforementioned control point selector;

Figure 4 is a sectional elevation of the motorized valve used for controlling outflow;

Figure 5 is a sectional end view of the manual override mechanism for operating the aforementioned valve and for indicating the position of the valve.

Figure 6:
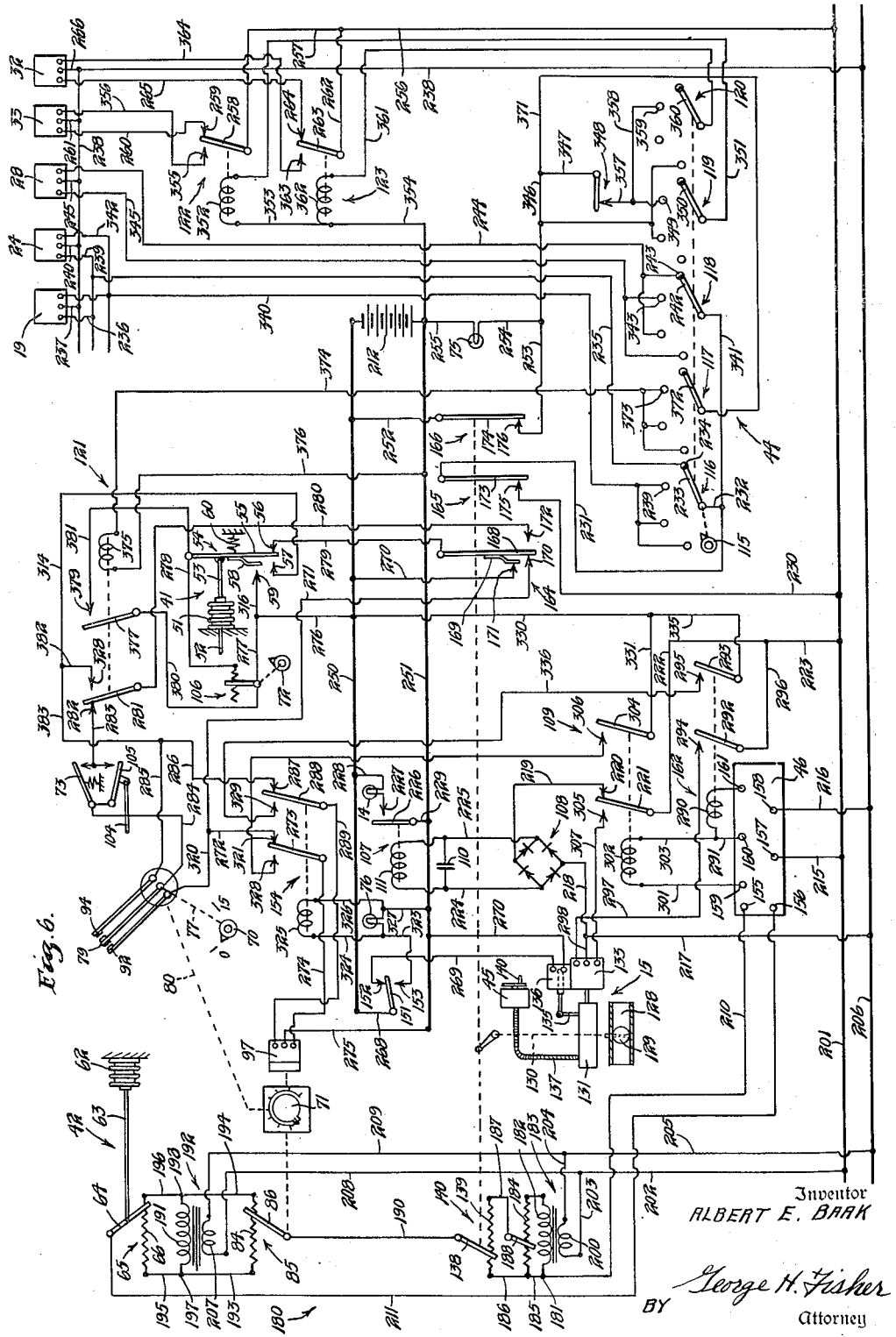
Figure 6 is a schematic wiring diagram of the present control apparatus.

Referring to Figure 1, pressurized aircraft cabin 10 is schematically shown in its relation with compressors 11, ram air inlets 12, supply duct means generally designated 13, recirculating duct means 14, outflow valve means 15, and other control apparatus to be specifically enumerated. The intake portions of compressors 11, and ram air inlets 12 are preferably located in a frontal portion of the airplane, such as along the leading edges 16 of the aircraft wings. The discharge from compressors 11 may be dumped through exit means 17 or may be supplied through duct means 13 to the cabin, as shown. Adjustable damper means 18 controlled by reversible motor means 19 determine whether the air will be dumped or directed through conduit means 13 to the cabin. Ram air entering through inlets 12 may be directed through ducts 20 to duct means 13 or through ducts 21 which supply cooling air to heat exchangers 22. The flow of air through ducts 20 is either permitted or prevented by pressure seal damper means 23 controlled by reversible motor means 24. The flow of air through ducts 21 is controlled by damper means 249 but they form no part of this invention and will not be further described.

The air supplied cabin 10 is diverted directly to the said cabin through duct means 13 when diverting damper means 25 is in the position shown but may be directed through a branch duct 26 past circulating fan 27 when damper means 25 is adjusted to its opposite position. Damper means 25 is operated by reversible motor means 28. Recirculating duct means 14, as its name implies, receives air from the cabin 10 and delivers it into duct 26 where flow is induced by circulating fan means 27. Under some conditions, recirculation may be prevented by damper 29 and the return air may be dumped to the outside atmosphere through ventilation outlet 30 controlled by damper means 31. Damper means 29 and 31 are operated by reversible motor means 32 and 33, respectively. Motor means 19, 24, 28, 32 and 33 are substantially alike and comprise conventional capacitor type reversible control motors operating through suitable gear trains and including suitable internal limit switches. These motors are energized by the 115 volt 400 cycle current supply of the airplane, the energization of these motors being controlled in a manner to be described. As will be made clear in the succeeding description, damper 31 is closed when the cabin is pressurized, as are pressure seals 23, hence the only controlled outflow for the air introduced to the cabin must be through valve means 15. Therefore, the means controlling valve 15 controls the pressure in the aircraft cabin.

The control equipment for outflow valve 15 includes a differential pressure controller 41, an absolute pressure controller 42, a main control panel 43, a main switching means 44, a manual override device 45, an amplifier 46, and a junction box 47. This apparatus is shown schematically connected, with the main switching means 44 also being shown in its schematic relation with the aforementioned control motors. While the present control components are shown schematically located in the cabin of the craft, this is not a necessary arrangement, but rather is merely a convenient one. Certain of the components, such as the amplifier, junction box, and other such means may be located in non-pressurized portions of the aircraft, if desired.

Differential pressure controller 41, as shown in Figure 6, comprises a bellows 51 having its outside exposed to the pressure of the air within the cabin and the inside of the same connected by tube means 52 to the outside atmosphere. Bellows 51 is connected by link 53 to a pivoted switch means 54, said switch means 54 having a blade 55 coacting with contact 56 or contact 57. A second blade 58 carried by switch means 54 coacts with contact 59. A suitable tension spring 60 biases blade 54 to the right in such a manner that blade 55 is in engagement with contact 56 at all differential pressures below 4.6 pounds per square inch; blade 55 engages contact 57 at a differential pressure of 4.7 pounds per square inch, and blade 58 engages contact 59 at differential pressures at or in excess of 4.8 pounds per square inch, these values being illustrative only.

Absolute pressure responsive device 42 in Figure 6, comprises an evacuated bellows 62 having an internal expansible spring, not shown. Bellows 62 is connected through link 63 to pivoted wiper means 64 of potentiometer 65. In addition to wiper 64, potentiometer 65 includes a resistor 66. Because device 42 responds to the absolute pressure in cabin 10, it is located in the said cabin. The device is so adjusted that wiper 64 is at the right extreme of resistor 66 at an absolute pressure of 30 inches of mercury and is moved to the left extreme of resistor 66 upon a decrease in the absolute pressure to 17 inches of mercury, for instance.

Control panel 43, as shown in Figures 1 to 3 and 6, includes a manual adjusting knob 70, a movable index 71, a rate control 72, and a push button switch 73 for aligning the index with the local barometric pressure and for otherwise testing the system on the ground. The panel 43 also includes a low pressure or power failure signal light 74, a signal light 75 for indicating when the outflow valve is wide-open, and a signal light 76 for indicating that the manual override is being used. In Figure 6 no attempt has been made to arrange the component parts of control panel 43 in the manner shown in Figure 1 because of the added complications in the wiring diagram that would result. As is best shown in Figures 2 and 3, knob 70 is fixed to a shaft 77 which carries an arm 78, preferably of insulating material, and to which is attached at its outer end a contact means 79. Shaft 77 is journaled in tube 80 and has its right extreme supported by frictional bearing means 81, the frictional bearing means being provided for retarding rotation of shaft 77 so that knob 70 and contact means 79 will remain in any adjusted position in spite of spring means 89, to be described. Tube 80 is journaled in bearing portion 81' of the front wall 82 of panel 43 and is fixedly attached to index 71 at its left end. A relatively large gear 83 preferably of Bakelite or the like, is keyed to tube 80 for rotation therewith so that gear 83 and index 71 rotate in unison. A resistor 84 of potentiometer 85 is mounted adjacent the said front wall 82 and is swept over by wiper 86 carried by said gear 83. A pair of supporting bracket members 87 and 88 are loosely journaled on tube 80 and are urged toward each other by a coil spring 89. Bracket 87 carries an insulating block 91 which in turn carries an electrical contact 92, while bracket 88 carries a block 93 which in turn carries an electrical contact 94. Contacts 92 and 94 are arranged to align with contact means 79, but in a neutral position, they are held in slightly spaced relation from said contact means 79 by a spacer member 95 attached to gear 83 and extending between blocks 91 and 93.

Gear 83 is driven by pinion 96 which in turn is driven by geared motor means 97. Motor means 97, for the purpose of this description, is preferably a controllable speed reversible direct current motor of a sort having good variable speed characteristics when the voltage applied to the same is varied by a simple rheostat. Obviously, a reversible capacitor type A. C. motor may be substituted for this motor, or any other suitable controllable speed motor may be used. As will be made clear in the subsequent description of the operation of the present mechanism, and as will be noted in Figure 6, the present chaser switch arrangement is used to control the operation of motor means 97. As will be noted, when knob 70, and therefore contact means 79, is adjusted in either direction, contact 92 or 94 is engaged and it and its respective bracket member is rotated about tube 80 away from the other bracket member, the said other member being prevented from following by member 95 unless motor 97 drives gear 83 in the proper direction, which it will do when energized. This motion of gear 83 will continue until spacer 95 drives the first named contact out of engagement with 79.

Index member 71 is preferably of transparent material such as Lucite, or the like and includes a projecting portion 98 having an indicating line 99 which easily permits comparison of the position of the said line and the underlying indicia. Knob 70 is attached to a plate portion 100 which includes an indicating portion 101, the portion 101 normally being turned to align with the proper value shown on the scale plate or indicia for selecting a desired cabin pressure, the index member 98 then being driven to align with 101 in a manner to be described in the subsequent description. Because of the difficulties of showing the structure illustrated in Figures 2 and 3 schematically, it is noted that the mechanism in Figure 6 differs in detail from that of Figures 2 and 3, but is adapted to function in a like manner. It is thus considered that the Figures 2 and 3 apparatus is that intended and the showing in Figure 6 is merely for describing the operation of the present mechanism.

In addition to including the selector knob 70 and index 71, with its associated control potentiometer and chaser switch arrangement, control panel 43 also includes a push-button switch 73 for permitting operation of the present mechanism while the airplane is on the ground and especially for the purpose of aligning the index member 98 with the proper indicia for showing the atmospheric pressure at the altitude of the aircraft. In parallel with push-button switch 73 is a landing gear switch 105 operated by linkage 104 from the landing gear retraction mechanishm in such manner that the switch 105 is opened when the landing gear is down and the said switch is closed when the landing gear is retracted. Rate control means 72 of control panel 43 includes a rheostat 106 for controlling the speed of motor means 97, as before mentioned. Control panel 43 also includes a signal light 74 for showing low pressure or A. C. power failure. This signal light is energized when relay means 107 is deenergized, the said relay means 107 being energized from the A. C. current supply through a full wave rectifier 108 when relay 109 is deenergized. A capacitor 110 is connected in parallel with winding 111 of the said relay 107 for delaying the deenergization of relay 107 for reasons to be described. As before noted, panel 43 also includes a signal light 75 to indicate when the outflow valve is wide-open. The energization of light 75 is controlled by switching means associated with the outflow valve, to be described. In addition, a further signal light 76 is provided to indicate when the manual override mechanism is engaged.

Main switch means 44 includes an adjusting knob 115 and five banks of switches, 116, 117, 118, 119 and 120. Each of these switch banks has four positions, the first on the left being the "Off" position, the next position being entitled "Ground"; the next position being the "Unsupercharged" position and the right extreme position, that shown, is the "Supercharged" position. Switch bank 116 controls the operation of motors 19 and 24, switch bank 117 controls the energization of relay 121, switch bank 118 controls the energization of motor means 28, switch bank 119 controls the energization of relay means 122 which in turn controls the energization of motor 33 and switch bank 120 controls the energization of relay means 123 which controls the energization of motor means 32.

Outflow valve means 15 includes an outflow passage 128 and a valve member 129 adapted to regulate the passage of air through the same, the said valve means 129 being carried on a shaft 130. Shaft 130 is rotated by a gear train indicated generally as 131 which is connected through a clutch means 132 to a reversible electric motor means 133. Clutch means 132 is urged out of engagement by a spring 134 acting on a pivoted lever 135 and is operated into engagement by a solenoid means 136 when the said solenoid means is energized. Obviously, the solenoid means 136 has sufficient power to overcome spring 134 so that clutch 132 may be engaged. Gear train 131 may also be operated by flexible cable means 137 in a manner to be described. In addition to positioning valve 129, shaft 130 also positions wiper 138 along resistor 139 of follow up potentiometer 140 and operates switching means (Fig. 6), to be described. Motor means 133 may be of any reversible sort but preferably is of the two phase capacitor type similar to motors 19, 24, etc., previously mentioned. While valve means 15 is shown as a conventional butterfly valve, this is intended to be only illustrative and any suitable valve and operating mechanism may be used instead of the means shown.

Manual override mechanism 45 is connected to valve means 15 by flexible cable means 137. Override means 45 includes a hand crank 140 for rotating shaft 141 journaled in housing 142 of the means 45 and which shaft carries a clutch part 143 normally held out of engagement with a mating clutch part 144 by spring means 145. By pushing in on crank 140 sufficiently to overcome spring 145 and thus engage clutch parts 143 and 144, gear train 131 of outflow valve 15 may be manually operated from crank 140 through the flexible cable means 137 to thus provide a manual operating means for the valve. In addition to crank 140 operating valve means 15 through flexible cable means 137, it is noted that means 45 includes an indicator member 146 extending through slot 147 in housing 142. Indicator means 146 is attached to a gear 148 forming part of a gear train 149 which is similar in ratio to gear train 131. Thus, whenever flexible shaft 137 is operated by either motor means 133 or hand crank 140, any rotation of shaft 137 will be reduced and indicated by indicator means 146. By making both the gear trains alike in ratio, the position of valve means 129 is shown at all times by indicator 146. In its normal operation, with clutch part 143 disengaged from clutch part 144 by spring means 145, manual override means 45 acts only as an indicator to show the position of valve means 129. Override means 45 also includes a single pole double throw switch means 150 which, referring to Figure 6, includes a movable blade 151 and stationary contacts 152 and 153. Switch means 150 controls the energization of the aforementioned solenoid means 136 for operating the clutch 132 of valve means 15, and also controls the energization of relay means 154 and signal light 76 in a manner to be described. Switch means 150 has been shown separated from override means 45 in the schematic wiring diagram in Figure 6 for convenience.

The amplifier 46 used in the present disclosure is of any conventional sort that will reversibly control a motor, either directly or by relays, to cause rotation of the motor in one direction when a signal of one phase is impressed upon its input and to cause rotation of the motor in the opposite direction when a signal of opposite phase is supplied its input. Amplifier 46 includes input terminals 155 and 156, power supply terminals 157 and 158, output terminal 159, common output terminal 160, and output terminal 161. Relay means 109 is connected between terminals 159 and 160 and relay means 162 is connected between terminals 160 and 161. When a signal of one phase is imposed upon terminals 155 and 156, one of relays 109 or 162 is energized whereas, if a signal of opposite phase is imposed upon input terminals 155 and 156, the other of the said relays will be operated. Relays 109 and 162 control the energization of outflow valve motor means 133 and may control, under circumstances to be described, rate motor means 97. While any amplifier of the sort described may be used for the present mechanism, I have found one such as that described in the co-pending application of Albert P. Upton, Serial No. 437,561, filed April 3, 1942, now Patent No. 2,423,534, to be quite satisfactory.

While a junction box 47 is shown in Figure 1 and is used in the commercial application of the present system, it is not shown in other figures of the drawing because of the added complications that would be required in the showing of the wiring. The junction box 47 is conventional in nature and may be considered to include the usual terminal strips and any accessory apparatus that can be properly located in the said box.

In addition to operating potentiometer means 140, shaft 130 of outflow valve means 15 also operates switching means 164, 165 and 166. Switching means 164 includes a blade portion 168 and another blade portion 169. Blade portions 168 and 169 engage contacts 170 and 171, respectively, when the outflow valve is wide open and blade portion 169 engages contact 172 when the outflow valve is in any closed position. Blade 168 is so related to contacts 170 and 172 that it always engages one or the other of the said contacts. Switch means 165 and 166 include blades 173 and 174 which engage stationary contacts 175 and 176, respectively when the outflow valve is wide open, with blade 174 remaining in engagement with 176 during a predetermined initial closing movement of the valve and after 168 has engaged contact 172.

Potentiometers 65, 85 and 140 form part of a compound electrical network circuit generally identified as 180. This network circuit, starting from output terminal 181 includes a secondary winding 182 of transformer 183 connected across a resistor 184, the left end of which is connected by wire 185 to terminal 181. One end of resistor 139 of potentiometer 140 is connected by wire 186 through wire 185 to terminal 181, and the other end of resistor 139 is connected by wire 187 to wiper 188 which is adjustable over resistor 184. Secondary winding 182 impresses an electrical potential across resistor 184 and, when wiper 188 is adjusted to the extreme right of resistor 184, a like potential is impressed across resistor 139. Then, as wiper 138 is adjusted across resistor 139, a variation in potential between terminals 181 and wiper 138 equivalent to the full voltage impressed by secondary winding 182 may be had. However, as will be noted, when wiper 188 is adjusted to the extreme left on resistor 184, all portions of resistor 139 will be at the same potential as terminal 181, hence movements of wiper 138 across resistor 139 will have no appreciable effect. In the position shown, with wiper 188 most of the way across resistor 184 toward the left side, a small potential is impressed across resistor 139 hence adjustment of wiper 138 across resistor 139 will cause slight variation in potential between terminal 181 and wiper 138. Wiper 188 is made adjustable on resistor 184 to provide adjustable means for controlling the amount of rebalancing that can be impressed in the said network, potentiometer 140 being a rebalance potentiometer, as will be noted. However, because a rebalance potentiometer tends to introduce droop into the system, it is desirable to use as little rebalancing effect as possible, and in the present instance, only enough rebalancing is used to prevent "hunting." Under some circumstances, it may be possible to completely eliminate this portion of the network and connect terminal 181 directly to wire 190 which now connects wiper 138 with wiper 86. Continuing with the description of the network 180, wiper 138 is connected by wire 190 to wiper 86 of potentiometer 85. Potentiometers 85 and 65 are connected in parallel across secondary winding 191 of transformer 192 by wires 193 and 194 and 195 and 196, respectively. This arrangement will be recognized as a conventional voltage dividing network having input terminals 197 and 198 and having output terminals comprising wipers 86 and 64. Primary winding 200 of transformer 183 is energized by the circuit: line wire 201, wire 202, wire 203, winding 200, wire 204, wire 205, and line wire 206. Primary winding 207 of transformer 192 is energized by the circuit: line wire 201, wire 202, wire 208, winding 207, wire 209, wire 205 and line wire 206. Output terminal 181 of compound network 180 is connected to terminal 155 of amplifier 46 by wire 210, while wiper 64, forming the other output terminal of the network 180 is connected to input terminal 156 of the amplifier by wire 211.

As previously mentioned, the main power supply for the present apparatus, obtained through line wires 201 and 206 is 115 volt 400 cycle alternating current. As it is convenient to have some of this apparatus energized by direct current, a suitable source of direct current such as battery 212 is also provided. Obviously, any other suitable source of direct current may be used such as a motor generator set, rectifier means, or the like.

To better explain the function of the present apparatus, it will now be discussed in terms of its operation.

Operation

In describing the operation of the present apparatus, let it be assumed that the aircraft containing the same is located on a field at near sea level altitude and is being prepared for a flight. Assuming that the 115 volt 400 cycle alternating current source is energized, it is noted that network circuit 189 is energized by a circuit previously traced. In addition, current is supplied amplifier 46 by the circuit: line wire 201, wire 215, terminal 157, terminal 158, wire 216, and line wire 206. Further, rectifier 108 is energized by the circuit: line wire 206, wire 217, wire 218, rectifier 108, wire 219, out contact 220 of relay 109, blade 221 of said relay, wire 222, wire 223 and line wire 201. Relay 107 is energized from rectifier 108 by the circuit: wire 224, winding 111, and wire 225 back to rectifier 108. This circuit results in winding 111 being energized so that blade 226 is pulled out of engagement with contact 227 so that light 74 is not energized. As before noted, capacitor 110 is connected in parallel with winding 111 between wires 224 and 225.

In addition, motors 19, only one being shown in Fig. 6 since they are all connected in parallel, are energized by the circuit: line wire 201, wire 230, contact 175, blade 173, wire 231, wire 232, switch blade 233, contact 234, wire 235, wire 236, motor means 19, common wire 237, wire 238 and line wire 206. This energizes motor means 19 in a manner to drive the respective damper means to a vent closing position so that the discharge from compressors 11 will be delivered through duct means 13 to the cabin 10. In addition, motor means 24 are connected in parallel with motor means 19 by wires 239 and 240 and are therefore energized to operate their damper means to a duct closing position so that the ram air inlets to duct 13 are sealed off, thereby preventing the compressed air from leaking back out through the ram air inlets. Motor means 28 is controlled by a circuit: line wire 201, wire 230, switch means 165, wire 231, wire 341, blade 242, contact 243, wire 244, motor means 28, wire 245, wire 238, and line wire 206. This energizes motor means 28 in a manner to operate damper means 25 in a direction to divert the compressed air from compressors 11 directly through duct 13 into cabin 10.

Assuming that battery 212 is energizing direct current line wires 250 and 251, and with the outflow valve in a wide open position, it is noted that light 75 is energized by the circuit: line wire 250, wire 252, switch blade 174, contact 176, wire 253, wire 254, light 75, wire 255 and line wire 251. In addition, relay 121 is not energized, and relays 122 and 123 are not energized due to the present adjustment of switch means 44. With relay means 122 deenergized, motor means 33 is energized by the circuit: line wire 201, wire 256, wire 257, blade 258 of relay 122, contact 259, wire 260, motor means 33, wire 261, and wire 238 to line wire 206. This energizes motor means 33 in a manner to close damper means 31 to prevent leakage of air through outlet means 30. Likewise, with relay 123 not energized, motor means 32 is controlled by the circuit: line wire 201, wire 256, wire 262, blade 263, contact 264, wire 265, motor means 32, wire 266, wire 238 and line wire 206. This energizes motor means 32 in a manner to drive damper means 29 to open position so as to permit recirculation of air through duct means 14.

With switch 150 on control 45 adjusted to an "Automatic" position, solenoid 136 associated with valve means 15 is energized by the circuit: line wire 250, wire 268, switch blade 151, contact 152, wire 269, solenoid 136, wire 270, and line wire 251. This energizes solenoid 136 in a manner to cause engagement of clutch means 132 so that motor means 133 is in driving relation to the gear train 131 and valve member 129.

With transformers 183 and 192 of network 180 energized, it is noted that wiper 138 of potentiometer 140 is at the left extreme of resistor 139; hence, the said wiper is at the same potential as terminal 181. Therefore, no voltage is being added to the network by this portion of the circuit. Further, it is noted that both wipers 86 and 64 are at the right of their respective resistors and, since they are thus connected by wires 194 and 196, they are at the same potential; hence, there is no potential difference between 181 and wiper 64, no input signal is being supplied the amplifier, and there is therefore no output to energize either of relays 109 or 162.

In discussing network 180, potential is referred to. However, as is obvious upon inspection, the present network circuit is energized by alternating current and, as will be clear in the discussion of the aforementioned Upton application, amplifiers of the sort used depend upon changes in phase relation of the input voltage rather than upon mere voltage differences. However, rather than discuss the present network in terms of phase relations, it is much more convenient to discuss the said network at a particular half cycle instant of time during which conventional direct current relations hold true. When considered on this basis, it is then proper to discuss the signal from the network circuit in terms of positive or negative potential. For convenience, it will be considered at the moment in question that the left sides of secondary windings 182 and 191 are negative and the right sides positive in potential. Further, it will be considered that when terminal 156 is positive relative to terminal 155, amplifier 46 will operate to energize relay 109 to cause an opening of valve 15, whereas when terminal 156 is negative relative to terminal 155, relay 162 will be energized to cause a closing movement of the valve. It is again noted that while the present description will relate to terminal 156 being positive or negative relative to 155, in actual practice the network will impose signals on the terminals of one phase or another, and the present description in terms of potential is merely a convenient way of describing the action that takes place. Of course, if a direct current network be used, this description would also apply.

With the airplane on the ground, and with outflow valve 15 wide-open, the air pressure in the cabin is the same as that on the outside, hence bellows 62 positions its wiper 64 in response to atmospheric pressure. Now, to make certain that index 71, as well as the control point for the system, is properly adjusted so that any subsequent cabin pressurizing will take place from the present starting point, push button switch 73 is actuated to close its contacts. Now, with the outflow valve in wide-open position and switch means 164, 165 and 166 in a valve open position, it is noted that rate motor 97 is energized by the circuit: line wire 250, wire 270, contact 171, blade 169, blade 168, contact 170, wire 271, wire 272, contact 321, blade 273, wire 274, motor means 97, wire 275 and line wire 251. This energizes rate motor 97 in a direction to rotate index 71 counterclockwise and to move wiper 86 to the right across resistor 84, or in a direction to cause a closing movement of the outflow valve. So long as wiper 86 is to the left of wiper 64, wiper 64 is positive relative thereto and amplifier 46 is energized in a manner to drive the valve open. However, should wiper 86 be to the right of wiper 64, the said wiper 64 is then negative relative to wiper 86, terminal 156 is negative relative to wiper 155 and the amplifier 46 operates to drive the valve in a closing direction. Assuming that the aforementioned operation was sufficient to advance index 71 somewhat counter-clockwise of the position of the indicator 101 of knob 70, or to advance the index to a lower altitude than the knob is set for, it is noted that this will bring contact 94 in engagement with contact means 79 of the chaser switch. Further, assuming that it was possible for wiper 86 to advance to the right of wiper 64, thus making wiper 64 negative relative to wiper 86 and causing operation of the valve in a closing direction, it is noted that the initial closing movement of the valve breaks the engagement of blade 169 and contact 171 and blade 168 and contact 170. Further, upon breaking the contact between blade 168 with contact 170, contact is immediately made between blade 168 and contact 172. Now, when push button 73 is engaged to test the system, rate motor 97 is energized by the circuit: line wire 250, wire 276, wire 277, rheostat 106, wire 278, blade 55 of differential controller 41, contact 56, wire 279, blade 168, contact 172, wire 280, switch blade 281 of relay 121, out contact 282 of said relay, wire 283, push button switch 73, wire 284, contact means 79, contact 94, wire 285, wire 286, out contact 287 of relay 154, blade 288 of said relay, wire 289, motor means 97, wire 275 and line wire 251. This energizes rate motor 97 in a direction to drive index 71 in a clockwise direction and to advance wiper 86 to the left across resistor 84. When wiper 86 is moved sufficiently to the left to make wiper 64 positive relative to the same, amplifier 46 is energized in a manner to operate valve means 15 in a direction to open the said valve and then, as the valve is moved toward wide-open position, blade 168 is moved out of engagement with contact 172 thus breaking the test circuit. Thus, it will be noted that the operation of the valve to a wide-open position causes operation of the rate motor in a manner to tend to drive the valve toward a closed position and will thus move the index to a position slightly to one side of the pressure being indicated by the absolute pressure device 42 whereas, when push button 73 is then operated, it will tend to cause energization of the rate motor in a direction to drive the wiper slightly to the other side of the indication equivalent to the pressure being responded to by device 42. In this manner, the index will be moved to almost the exact indication of the pressure existing at the field at which place the testing is being done.

With the index properly located, assume that a flight is about to begin and knob 70 is turned to a pressure equivalent to a 10,000 ft. altitude and the flight is started. Turning the knob in the direction indicated brings contact means 79 into engagement with contact 94 thus tending to energize the rate motor, as before described. However, with push button switch 73 disengaged and landing gear switch 105 still open, the only circuit for energizing the rate motor 97 is that previously described due to the wide-open position of the valve, and which energization immediately tends to drive the valve just off wide-open position. However, with the flight now started, and with a substantially wide-open valve, it is noted that the pressure in the aircraft will tend to fall, thus causing bellows 62 to expand and move wiper 64 to the left across resistor 66. In addition, as the aircraft left the ground and the landing gear was retracted, switch 105 was then closed. This energizes the rate motor 97 by the same circuit as the test circuit controlled by switch 73 which tends to drive index 71 clockwise and to advance wiper 86 to the left across resistor 84. However, since the energizing current goes through rheostat 106, the rate motor 97 is driven at a predetermined speed so that the adjustment is made only at a desired rate, such as 300 feet of altitude change per minute. Assuming that the aircraft is rising at a higher rate than this, the pressure change in the cabin will tend to be at a higher rate and wiper 64 will tend to be advanced to the left across resistor 66 at a higher rate then wiper 86 advances to the left across resistor 84. As before noted, when wiper 64 is to the left of wiper 86, it is negative relative to said wiper 86, and terminal 156 is then negative relative to terminal 155 and valve means 15 is operated in a closing direction.

Valve means 15 is operated in a closing direction due to the energizing of relay 162 by amplifier 46 by the circuit: amplifier terminal 161, winding 290, wire 291, and terminal 160 of the said amplifier. This pulls blades 292 and 293 into engagement with contacts 294 and 295, respectively. Motor means 133 is then energized by the circuit: line wire 201, wire 273, wire 296, blade 292, contact 294, wire 297, motor means 133, wire 298, wire 217 and line wire 306. This energizes motor means 133 in a direction to close the valve.

Closing valve member 129 of valve means 15 tends to prevent the escape of air from the cabin and thus causes an increase in pressure in the same. The increase in pressure tends to contract bellows 62 and drive wiper 64 to the right across resistor 66, or at least to retard the leftward movement of the said wiper across the said resistor. In either event, this tends to permit wiper 86 to be advanced to the left of wiper 64, thus making wiper 64 positive relative to wiper 86 and making terminal 156 of the amplifier positive relative to terminal 155. When this happens, relay 109 is energized by the circuit: terminal 159 of amplifier 46, wire 301, winding 302 of the said relay, wire 303, wire 291 and terminal 160. This pulls blades 221 and 304 of relay 109 into engagement with contacts 305 and 306, respectively, and causes energization of motor means 133 by the circuit: line wire 201, wire 223, wire 222, blade 221, contact 305, wire 307, motor means 133, wire 298, wire 217, and line wire 301. This energizes the motor means 133 in a direction to drive the valve member 129 in an opening direction to thus permit a more rapid escape of air and permit bellows 62 to expand and advance wiper 64 to the left across resistor 66. As thus described, wiper 86 is being advanced across resistor 84 at a predetermined rate and valve 15 is controlled in a manner to vary the pressure in the cabin substantially as called for by any particular position of wiper 86. The position of wiper 86 thus determines the control point for the present system. Should the cycling operation of the outflow valve means 15 become rapid enough to be termed "hunting," ratio selector wiper 188 is moved to the right across resistor 184 to give added effect to follow up potentiometer 140. Thus, assuming that blade 64 is to the left of blade 86 and is thus negative relative thereto, thereby causing a closing movement of the valve, it is noted that the closing movement of the valve will advance wiper 138 to the right across resistor 139, thus making wiper 138 positive relative to terminal 181 and adding a positive signal tending to balance out the negative signal causing the closing movement of the valve. This stabilizing, or follow-up, action is well known in the prior art and is more fully explained in my prior application, Serial No. 541,583 previously referred to. As before noted, the amount of follow-up is kept as low as possible due to the well known effect of follow-up action introducing droop into the system.

It is noted that energization of relay 109 breaks the circuit to rectifier 108. However, due to the very low lag in the present system, relay 109 is normally energized in a "pecking" manner or for very short time intervals. Because of the capacitor 110, relay 107 will remain energized for a short period of time after the rectifier is deenergized, this period normally being greater than the time of energization of relay 109. However, should the pressure in the cabin be sufficiently low that the relay 109 is energized for longer periods than normal, then relay 107 drops out and light 74 is energized by the circuit: line wire 250, wire 228, light 74, contact 227, blade 226, wire 229 and line wire 251. Obviously, an A. C. power failure would cause light 74 to be energized in the same manner.

When the aircraft cabin reaches a pressure corresponding to the 10,000 ft. altitude called for by the cabin pressure selector chaser switch, it is noted that contact 94 will become disengaged from contact means 79 thus breaking the energizing circuit for the rate motor. With the aircraft above 10,000 feet and the cabin pressure at 10,000 feet and with the index and knob adjustment similar so that no circuit is completed through the chaser switch, wiper 86 remains stationary and any pressure change in the cabin will tend to move wiper 64 in a direction to cause an immediate restoration of the pressure, in a manner previously described. If the aircraft should now continue to climb to an altitude such that the differential between the cabin pressure and the atmospheric pressure exceeds 4.6 pounds per square inch, then blade 55 will be moved out of engagement with contact 56 by contraction of bellows 51. When this happens, the circuit to the rate motor 97 which would normally be used to increase the cabin pressure is opened and regardless of any subsequent movement of the control knob 70, the cabin pressure cannot be controlled to a higher absolute value. Should the differential increase to 4.7 pounds per square inch, contact portion 55 of differential pressure device 41 moves into engagement with contact 57 thus energizing motor means 97 by the circuit: line wire 250, wire 276, wire 277, rheostat 106, wire 278, switch blade 55, contact 57, wire 311, wire 383, wire 286, contact 287, blade 288, wire 289, motor means 97, wire 275 and line wire 251. This will be recognized as the circuit which energizes motor means 97 in a direction to advance index 71 in a clockwise direction and to move wiper 86 to the left across resistor 84. A leftward movement of wiper 86 across resistor 84 tends to make wiper 64 positive relative thereto, and, as before noted, this action results in an opening movement of valve means 15. The opening movement of valve means 15 tends to relieve the pressure and thus reduce the differential. However, should the differential pressure increase to 4.8 pounds per square inch and thus bring blade 58 into engagement with contact 59, motor means 97 is energized by the circuit: line wire 250, wire 276, wire 316, contact 59, blade 58, blade 55, contact 57, wire 311, wire 383, wire 286, contact 287, blade 288, wire 289, motor means 97, wire 275, and line wire 251. This energizes motor means 97 in a manner similar to that previously described, but with the exception that full voltage is applied to the motor 97, rheostat 106 being by-passed, thus permitting full speed readjustment of the cabin pressure in a direction to reduce the absolute pressure of the cabin and thus reduce the said differential pressure. Upon a reduction of the differential pressure, due to a reduction in absolute cabin pressure or to the aircraft descending to a lower elevation, the previously described control of the rate motor will be resumed.

If the airplane should start a slow descent from its high altitude, and knob 70 is adjusted to a lower altitude pressure for the cabin, such as that corresponding to the altitude of the next field to be used, it is noted that contact means 79 of the chaser switch will be moved into engagement with contact 92. This will energize motor means 97 by the circuit: line wire 250, wire 276, wire 277, rheostat 106, wire 278, switch blade 55, contact 56, wire 279, switch blade 168, contact 172, wire 280, switch blade 281, contact 282, wire 283, switch 105, wire 284, contact means 79, contact 92, wire 320, wire 272, contact 321, blade 273, wire 274, motor means 97, wire 275, and line wire 251. This will be recognized as the circuit which drives index 71 counterclockwise and advances wiper 86 to the right across resistor 84. Movement of wiper 86 to the right thus tends to lead the movement of wiper 64 and in so doing, tends to make wiper 64 negative relative thereto. As before noted, when wiper 64 is negative relative to wiper 86, valve means 15 is adjusted in a closing direction thus tending to increase the pressure in the cabin.

Now, assume that the aircraft descends at a more rapid rate than the cabin pressure is decreased, so that the aircraft altitude actually tends to become less than that of the cabin altitude. As the aircraft tends to reach the altitude to which the cabin is being controlled, the differential between the cabin pressure and the outside pressure continues to diminish; hence, the rate of flow through the outlet valve diminishes, thus tending to retard the desired decrease in pressure of the cabin and resulting in slight over pressure of the same. Over pressure of the cabin, as before noted, results in a contracting of bellows 62 and movement of wiper 64 to the right across resistor 66 or at least an increase in the rate at which it was formerly moving. This causes wiper 64 to become positive relative to wiper 86 which, as before noted, controls amplifier 46 in a manner to drive the valve open. When the aircraft is at the same or a slightly lower altitude than the value for which the cabin pressure is adjusted, even a wide-open valve cannot reduce the cabin pressure. However, since the added pressure in the cabin causes wiper 64 to remain at the right of wiper 86, the valve is driven in an opening direction until it is wide-open. When the valve is driven to a wide-open position, rate motor 97 is energized by a previously traced circuit as follows: line wire 250, wire 270, contact 171, blade 169, blade 168, contact 170, wire 271, wire 272, contact 321, blade 273, wire 274, motor means 97, wire 275, and line wire 251. This will be recognized as the circuit which energizes motor means 97 in a direction to drive index 71 counter-clockwise and to move wiper 86 to the right across resistor 84. This circuit continues until wiper 86 is driven to the right of wiper 64 so that wiper 64 then becomes negative relative to wiper 86. Upon this happening, amplifier 46 controls valve means 15 in a manner to close the valve. The initial closing movement of the valve, however, separates contacts 171—169 and 170—168 thus breaking this energizing circuit for the rate motor. It will be noted that this energizing circuit for the rate motor did not include the rheostat, hence the adjustment was made at the full speed of the motor and, regardless of the position of the chaser switch, the motor was energized in a direction to drive the index to a position corresponding to the actual pressure existing in the aircraft cabin.

It will also be noted that whenever the valve is driven to a wide-open position and thus assumes a controlling effect on the rate motor, light 75 is energized by the circuit: line wire 250, wire 252, switch blade 174, contact 176, wire 253, wire 254, light 75, and wire 255. This warns the pilot to proceed with care.

From the above description, it is noted that when the aircraft goes below the altitude to which the aircraft cabin is being controlled, the index 71 and the control potentiometer 85 are adjusted to correspond to the actual altitude of the aircraft during such a descending flight. If the aircraft should now resume its upward flight, the rate motor will be energized through contacts 79 and 94 of the chaser switch and through rheostat 106 by a circuit previously traced. This will adjust the control potentiometer and index 71 at a controlled rate so that the pressure change in the cabin will be at the rate desired. In this manner, although it was impossible for the cabin pressure control apparatus to maintain control when the aircraft went below the controlled altitude of the cabin, it immediately resumed control of the pressure and maintained the same on any subsequent upward flight of the aircraft. Without this readjusting of the index and the control potentiometer, and assuming that they remained in their previously adjusted positions, then the cabin pressure would tend to change at the same rate as the aircraft until the aircraft went above the altitude for which the cabin pressure was controlled.

Assume now, that for some reason or another it is desired to operate the outflow valve manually. To do this, switch blade 151 of switch 150 is moved to its "Manual" control position, so that blade 151 is in engagement with contact 153. This breaks the previously described energizing circuit for solenoid 136, thus permitting spring means 134, as seen in Figure 4, to operate lever 135 in a manner to disengage clutch 132, thus disconnecting motor 133 from the valve. Further, relay 154 is energized by the circuit: line wire 250, wire 268, switch blade 151, contact 153, wire 323, wire 324, winding 325 of relay 154, wire 326, wire 327 and line wire 251. This energizes relay 154 and brings switch blades 273 and 288 into engagement with contacts 328 and 329, respectively. Also, as light 76 is connected across wires 323 and 327, it is energized and indicates that manual control of the outflow valve is now being effected. The operation of relay 154 as above described disconnects the rate motor from the previously described energizing circuits and connects the amplifier in controlling relation to the said rate motor by the circuit: line wire 250, wire 330, wire 331, switch blade 304, contact 306, wire 332, contact 328, blade 273, wire 274, motor means 97, wire 275 and line wire 251. As blade 304 is recognized as one of those of relay means 109, and which relay is energized upon a relatively high pressure in the cabin, or when wiper 64 is to the right of wiper 86, it is noted that a relatively high pressure in the cabin will energize a circuit to the rate motor causing it to drive index 71 in a counter-clockwise direction and to advance wiper 86 to the right across resistor 84. This will continue until wiper 86 reaches the potential of wiper 64 so that the signal to the amplifier is removed, thus deenergizing the relay 109 and preventing further operation of the rate motor in the manner described. The circuit for energizing the rate motor in the other direction is as follows: line wire 250, wire 330, wire 335, switch blade 293, contact 295, wire 336, contact 329, blade 288, wire 289, motor means 97, wire 275, and line wire 251. As will be noted, this energizes the rate motor in a direction to drive index 71 in a clockwise direction and to advance wiper 86 to the left across resistor 84. However, since blade 293 of relay 162 is operated to a circuit closing position only when the pressure is low in the cabin, or wiper 64 is to the left of wiper 86, and is thus negative relative thereto, it will be noted that a relatively low pressure in the cabin will cause an energization of rate motor 97 in a direction to drive the index and the control potentiometer to a position corresponding to a lower pressure value.

Now, to actually adjust the valve means 15, crank handle 140 is pushed in to overcome spring 145 so that clutch part 143 engages part 144, the handle then being rotated in a suitable direction. This operates flexible cable 137 which drives valve means 129 through gear train 131 in the desired direction. In addition, the position of the valve will be indicated by indicator 146 in the same manner as when the valve was automatically driven. Due to the light 76 being energized, warning is given that the manual override is engaged so that any hand cranking of the valve should be done with caution. Further, due to the aforementioned connecting of the amplifier in controlling relation to the rate motor, the index 71 will indicate at all times the exact pressure existing in the cabin. Due to the amplifier controlling the rate motor 97 to adjust the index 71 and the wiper 86 in a manner to cause wiper 86 to correspond in position to wiper 64, they are effectively controlled to not only indicate the exact pressure in the cabin but to maintain the control point for subsequent automatic control at that indicated value.

The present description has all been based upon a supercharged cabin. Now, if it be desired to operate the cabin in a non-supercharged condition, switch means 44 will be adjusted to the unsupercharged position by rotating knob 115 in a counterclockwise direction. This switch means, as before noted, controls the position of dampers 18, 23, 25, 29 and 31. However, it is noted that the energizing circuit for motors 19, 24 and 28, corresponding to dampers 18, 23 and 25, respectively, is completed through switch means 165 and this switch means, as previously noted, is closed only when the outflow valve is wide open. Further, the energizing circuits for motors 33 and 32, corresponding to dampers 31 and 29, respectively, are completed through switch means 166, which is also closed only when the outflow valve is wide open. Therefore, regardless of the adjustment of switch means 44 to a different position, none of the dampers effecting the pressure of the cabin can be actuated until the outflow valve is wide open. This is a safety precaution which prevents any decompression of the cabin by operation of switch means 44. Decompressing of the cabin must be at a controlled rate by the outflow valve hence, if it be desired to decompress the cabin, the outflow valve must be driven to a wide-open position by proper operation of the control knob 70 to reduce the pressure in the cabin to the atmospheric pressure existing outside the aircraft.

Assuming that the outflow valve is now in a wide-open position and that knob 115 of switch means 44 has been rotated to bring the blades of switches 116 to 120 inclusive to the adjacent counterclockwise set of contacts, it is noted that motor means 19 and 24 are energized by the circuit: line wire 201, wire 230, contact 175, switch blade 173, wire 231, wire 232, switch blade 233, contact 239, wire 340, motor means 19, wire 237, wire 238 and line wire 206. Motor means 24 is energized in parallel with motor means 19 by a wire 342 connected to wire 340. Also, motor means 28 is energized by a similar circuit as follows: line wire 201, wire 230, switch 165, wire 231, wire 241, switch blade 242, contact 343, wire 345, motor means 28, wire 245, and wire 238 to line wire 206. Energizing of motors 19, 24 and 28 in the manner described causes them to operate their respective dampers to the opposite position from that shown. With the new position of switch means 44, relay 122 is energized by the circuit: line wire 250, wire 252, blade 174, contact 176, wire 253, wire 346, wire 347, temperature responsive switch 348, wire 357, contact 349, switch blade 350, wire 351, winding 352 of relay 122, wire 353, wire 354 and line wire 251. Energizing relay 122 causes an energization of motor means 33 by the circuit: line wire 201, wire 256, wire 257, blade 258, contact 355, wire 356, motor means 33, wire 261, and wire 238 to line wire 206. Thus, providing the temperature responsive switch 348 is in a circuit closing position, motor 33 will be energized in a manner to open damper 31 and thus dump recirculated air to the outside. As the temperature responsive switch 348 comprises no part of the present invention, it will not be further discussed here.

Motor means 32 is energized under control of relay 123, as before mentioned. Relay 123 is energized by a circuit as follows: line wire 250, wire 252, blade 174, contact 176, wire 253, wire 346, wire 347, switch 348, wire 357, wire 358, contact 359, blade 360, wire 361, winding 362 of relay 123, wire 354 and line wire 251. This energizes motor means 32 by a circuit: line wire 201, wire 256, wire 262, blade 263, contact 363, wire 364, motor means 32, wire 266, and wire 238 to line wire 206. This circuit energizes motor means 32 in a direction to close off the recirculation of air simultaneously with the opening of damper 31. However, since this circuit also goes through temperature responsive switch 348, this recirculation is prevented only when the temperature responsive switch so permits.

Relay 121, assuming that valve 15 is in a wide-open position, is also energized by a circuit traced as follows: line wire 250, wire 252, blade 174, contact 176, wire 253, wire 346, wire 371, blade 372, contact 373, wire 374, winding 375 of relay 121, wire 376 and line wire 251. Energizing relay 121 shorts out rheostat 106, switches 73 and 105 and a portion of the chaser switch, as will be noted.

Assuming that the aircraft is now being flown in an unsupercharged condition, it will be noted that the outflow valve, assuming that the pressurizing control system is in automatic operation, is in a wide-open position. When the outflow valve is in a wide-open position, the rate motor is energized by a previously noted circuit going through switch means 164 which energizes the said motor means 97 in a direction to cause a closing movement of the valve means 15 whenever wiper 86 is advanced to the right of wiper 64 and at the same time is correctly positioning index 71. Now, as before noted, when wiper 86 is driven to the right of 64, amplifier 46 is controlled in a manner to drive the valve toward closed position thus breaking the previously noted circuit energizing the rate motor. Moreover, assuming that the aircraft is rising, the resulting movement of wiper 64 to the left tends to make it negative relative to wiper 86 thus also causing operation of the valve means in a closing direction. However, upon the valve moving from the wide-open position, relay 121 remains energized by the above noted circuit due to blade 174 remaining in engagement with 176 for a greater valve movement than is required to operate switches 164 and 165. With blades 281 and 377 of relay 121 in engagement with contacts 378 and 379, respectively, a circuit is then completed energizing rate motor 97 as follows: line wire 250, wire 276, wire 277, wire 380, switch blade 377, contact 379, wire 381, switch blade 55, contact 56, wire 279, switch blade 168, contact 172, wire 280, blade 281, contact 378, wire 382, wire 383, wire 286, contact 287, blade 288, wire 289, motor means 97, wire 275 and line wire 251. This will be recognized as a circuit which energizes rate motor means 97 in a manner to adjust index 71 in a clockwise direction and to move wiper 86 to the left across resistor 84. Further, this adjustment will be made at high speed because the rheostat 106 is by-passed. As wiper 86 is moved to the left of wiper 64, wiper 64 becomes positive relative to wiper 86, terminal 156 becomes positive relative to 155, and amplifier 46 controls motor means 133 in a manner to adjust valve 15 to a wide-open position. When the valve is adjusted to a wide-open position, switch blade 168 is moved out of engagement with contact 172 and into engagement with 170 as before. This breaks the aforementioned energizing circuit for the rate motor and re-establishes the previously mentioned circuit which again drives motor 97 in a manner to readjust the outflow valve away from open position. Thus, when the switch means 44 is adjusted to any of the unsupercharged positions, relay 121 is not only energized when the valve is in a wide-open position but remains energized during the initial closing movements of the valve sufficiently to control a circuit to cause the valve to again be opened to its extreme, while other switch means are available for driving the valve to a partly closed position whenever it reaches wide-open position. However, all of this controlling action is based on wiper 86 moving to one side or the other of wiper 64, hence the position of wiper 64, a function of the absolute cabin pressure, determines the point at all times about which the rate motor will control the index; therefore, the index must always keep step with the actual cabin pressure in the airplane. Because the index always keeps step with the actual pressure in the airplane, the potentiometer 85 is always adjusted so that if it be decided to supercharge the cabin and switch means 44 is so adjusted, then the change can be made without any sudden pressure changes and further changes in cabin pressure can be made at a controlled rate without delay.

It is thus noted that the present cabin pressure control system will not only function to maintain a given cabin pressure, but will effect changes in cabin pressure at a controlled rate. Further, upon the aircraft descending in altitude below the controlled altitude of the cabin, the control point will be shifted in accordance with the altitude of the aircraft, with a signal being given to the pilot to take care, and any subsequent rise in altitude of the aircraft will permit a change in the cabin pressure only at the controlled rate unless, of course, the limiting pressure differentials are exceeded. When the limiting pressure differentials are exceeded, it first becomes impossible to adjust the cabin to a higher absolute pressure, next a lower absolute pressure is called for by the apparatus and then if the differential pressure still further increases, the readjustment to a lower absolute pressure is made of the full speed of the apparatus.

Also, if the aircraft be flown in an unsupercharged condition, the outflow valve motor will be controlled in a manner to "hunt" about its wide-open position and the rate motor will be controlled to adjust the index and control point in accordance with the absolute pressure in the aircraft. Also, if the outflow valve be manually controlled, the amplifier which normally controls the outflow valve motor will be switched into controlling relation to the rate motor to thus adjust the index and control point in accordance with the absolute pressure in the cabin.

Provision is made for testing the apparatus on the ground before beginning the flight and, except during testing, changes in cabin pressure cannot be made until the aircraft leaves the ground and the landing gear is retracted. As safety features, signal means are provided for indicating low pressure in the cabin, lack of A. C. power, a wide-open outflow valve, and control of the outflow valve by manual means. As additional safety means, the switching apparatus controlling the pressure seals and the like of the cabin are so correlated with the outflow valve that no change in the supercharged condition of the cabin can be effected unless the outflow valve is in a wide-open position.

While the present invention has been rather specifically described, it is obvious that there are many substitutions and equivalents that can be used, hence the scope of this invention is to be determined only by the appended claims.

I claim as my invention:

1. Cabin pressure control apparatus for an aircraft including, in combination, outflow valve means, controller means for said valve means, motor means for adjusting said controller means, manual means for adjusting the direction and extent of travel of said motor means, means for adjusting the speed of travel of said motor means, means responsive to the differential of the pressure existing in the aircraft cabin and the atmospheric pressure surrounding the said cabin, said differential pressure responsive means including switching means operable to first prevent further operation of said motor means in a direction to adjust said controller means in a manner to increase the said differential and operable at a higher value of the said differential to cause operation of said motor means in a manner to reduce the said differential and operable at a still higher value of said differential to cause said motor means to adjust said controller means at high speed in a direction to reduce said differential, and means operable as an incident to the operation of said valve means to a wide open position for causing said motor means to adjust said controller means in a direction opposite to that caused by said differential pressure responsive means.

2. Cabin pressure control apparatus for an aircraft including, in combination, outflow valve means, amplifier means for controlling said valve means, network circuit means for controlling said amplifier means, absolute pressure responsive means for adjusting said network means, control point adjusting means for adjusting said network means, motor means for adjusting said control point adjusting means, manual means for controlling said motor means, means for regulating the speed by which said motor means can adjust said control point adjusting means, means responsive to the differential between the cabin air pressure and the atmospheric air pressure, said differential responsive means including means operable to control said motor means, means for switching said amplifier means out of control of said valve means and in controlling relation to said motor means, and means operable as an incident to the adjusting of said valve means to a predetermined limiting position for controlling said motor means.

3. Control apparatus for a pressurized aircraft cabin comprising, in combination, pressure controlling means, controller means including a device responsive to cabin pressure for controlling said pressure controlling means, manually adjustable means for adjusting said controller means and thus said controlling means, and means for effectively causing said pressure responsive device to adjust said manually adjustable means.

4. Control apparatus comprising, in combination, a positionable control device including a condition responsive means, means operable between limiting positions for controlling said control device, manual means for adjusting said controlling means, and means controlled by said condition responsive means and operable as a function of a predetermined limiting positioning only of said control device for adjusting said controlling means to a value corresponding to the value of the condition to which said condition responsive means is responding.

5. Control apparatus comprising, in combination, a positionable control device, means responsive to a condition indicative of a need for positiong said device for controlling said device, means for adjusting said condition responsive means, and switching means operable as a function of a predetermined positioning of said device for placing said condition responsive means in control of said adjusting means.

6. Apparatus for controlling a condition comprising, in combination, a condition controlling device, adjustable means responsive to said condition for automatically controlling said device, manual means for operating said device, other manual means for causing adjustment of said condition responsive means at a timed rate, means for indicating the said adjustment at any instance, and switching means for transferring control by said condition responsive device of said controlling device to said indicating means when said controlling device is manually operated, said indicating means then indicating the value of said condition.

7. Control apparatus comprising, in combination, a condition control means, condition responsive means, means connecting said condition responsive means in controlling relation to said control means, means for indicating and adjusting the controlling affect of said condition responsive means on said control means, motor means for adjusting said adjusting means, manual means for normally controlling said motor means, and means for connecting said condition responsive means in controlling relation to said motor means.

8. Control apparatus comprising, in combination, a condition control means, condition responsive means, means connecting said condition responsive means in controlling relation to said control means, means for indicating and adjusting the controlling affect of said condition responsive means on said control means, motor means for adjusting said adjusting means, manual means for normally controlling said motor means, additional manual means for operating said condition control means, and means for rendering said additional manual means effective and for connecting said condition responsive means in controlling relation to said motor means.

9. Control apparatus for controlling a condition in a space in relation to a similar condition outside of said space including, in combination, an adjustable control device, motor means for adjusting said device, means for normally controlling said motor means in a manner to permit it to operate at a predetermined fraction of its full speed, and differential condition responsive means responsive to a predetermined relatively high value of the condition inside said space relative to the condition outside said space for causing said motor means to adjust said control device to operate at its full speed in a direction to cause a reduction in the value of the said differential.

10. Control apparatus for controlling a condition in a space in relation to a similar condition outside of said space including, in combination, a condition controlling means, an adjustable control device for regulating the operation of said controlling means, motor means for adjusting said device, means for normally controlling said motor means in a manner to permit it to operate at a predetermined fraction of its full speed to permit said device to relative slowly adjust said controlling means, and differential condition responsive means responsive to a predetermined limiting value of the condition inside said space relative to the condition outside of said space for causing an immediate adjusting of said controlling means in a manner to reduce the value of the said differential.

11. Apparatus for controlling air pressure in an aircraft cabin comprising, in combination, outflow valve means, other valve means for controlling the pressure of air in the cabin, means for controlling said outflow valve means in a manner to maintain a predetermined pressure within said cabin, and switching means permitting either opening or closing of said other valve means only when said outflow valve means is in a wide-open position, at least a portion of said switching being operable in accordance with the wide open positioning of said outflow valve means.

12. Apparatus for controlling the pressure of air in the cabin of an aircraft including, in combination, outflow valve means, controller means for said valve means, motor means for adjusting said controller means, manual means for adjusting said motor means, differential pressure responsive means for controlling said motor means, means operable as an incident to positioning said outflow valve means in a wide-open position for controlling said motor means, means for indicating that said valve means is in a wide-open position, means for indicating a relatively low pressure in said cabin, manual means for controlling said outflow valve means, means for indicating the control of said outflow valve means by said manual means, and means preventing the control of said motor means by said manual means when the said outflow valve means is being manually adjusted.

13. In apparatus for controlling a condition in a space; adjustable means for varying said condition, said adjustable varying means being operable between limiting positions; actuating means for said varying means; and control means for said actuating means, said control means including apparatus responsive to said condition, means connecting said condition responsive apparatus in controlling relation to said actuating means, means for adjusting the controlling relation between said condition responsive apparatus and said actuating means to thereby vary the value of said condition to be attained, and means operable as an incident to said varying means reaching one of its limiting positions connected to adjust said controlling relation adjusting means.

14. In control apparatus for controlling one condition relative to a second condition; means for varying said one condition; means for controlling said varying means, said controlling means including apparatus responsive to said one condition; motor operated means for adjusting the controlling relation between said condition responsive apparatus and said varying means to thereby adjust the value of said one condition at which said apparatus is in effective control; means for adjusting the rate at which said motor operated means can adjust said relation; and means responsive to a predetermined differential between said one condition and said second condition connected through said rate adjusting means for causing operation of said motor operated adjusting means in a direction to reduce said differential.

15. Control apparatus comprising, in combination, a condition controlling device, means for controlling said device including condition responsive means, means for causing cycling operation of said device, and indicating means controlled by said controlling means and energized only upon a predetermined change in the operation of the operating cycles.

16. Apparatus for controlling air pressure in an aircraft cabin comprising, in combination, adjustable valve means for controlling a flow of air into said cabin, valve means for adjustably controlling air flow out of said cabin for maintaining predetermined pressure in said cabin, switching means operable by said outflow valve means at a predetermined outflow valve position, control means for adjusting said first named valve means, and means connecting said switching means in controlling relation to said control means.

ALBERT E. BAAK.

REFERENCES CITED

The following references are of record in the file of this patent:

UNITED STATES PATENTS

| Number | Name | Date |
|---|---|---|
| 1,832,809 | Hudson | Nov. 17, 1931 |
| 2,038,431 | Klages | Apr. 21, 1936 |
| 2,119,402 | Puffer | May 31, 1938 |
| 2,208,554 | Price | July 16, 1940 |
| 2,244,722 | Norcross | June 10, 1941 |
| 2,276,448 | Allen et al. | Mar. 17, 1942 |
| 2,307,199 | Cooper | Jan. 5, 1943 |
| 2,346,437 | Krogh | Apr. 11, 1944 |
| 2,399,326 | Crot | Apr. 30, 1946 |
| 2,401,832 | Krogh | June 11, 1946 |
| 2,407,257 | Del Mar | Sept. 10, 1946 |
| 2,407,540 | Del Mar | Sept. 10, 1946 |
| 2,413,027 | Maxson | Dec. 24, 1946 |
| 2,419,707 | Cooper et al. | Apr. 29, 1947 |
| 2,424,491 | Morris | July 22, 1947 |
| 2,450,881 | Cooper et al. | Oct. 12, 1948 |
| 2,463,489 | Kemper | Mar. 1, 1949 |
| 2,473,776 | Baak | June 21, 1949 |
| 2,484,847 | Paget | Oct. 18, 1949 |

FOREIGN PATENTS

| Number | Country | Date |
|---|---|---|
| 521,623 | Great Britain | May 27, 1940 |